US012599913B2

(12) United States Patent
Böckle

(10) Patent No.: US 12,599,913 B2
(45) Date of Patent: Apr. 14, 2026

(54) ROCK PROCESSING MACHINE WITH WEAR ASSESSMENT AND QUALITATIVE EVALUATION OF THE WEAR ASSESSMENT

(71) Applicant: Kleemann GmbH, Göppingen (DE)

(72) Inventor: Tobias Böckle, Weinstadt (DE)

(73) Assignee: Kleemann GmbH, Göppingen (DE)

( * ) Notice: Subject to any disclaimer, the term of this patent is extended or adjusted under 35 U.S.C. 154(b) by 367 days.

(21) Appl. No.: 18/533,687

(22) Filed: Dec. 8, 2023

(65) Prior Publication Data

US 2024/0238798 A1 Jul. 18, 2024

(30) Foreign Application Priority Data

Jan. 17, 2023 (DE) .................... 10 2023 101 025.5

(51) Int. Cl.
*B02C 25/00* (2006.01)
*B02C 21/02* (2006.01)

(52) U.S. Cl.
CPC ............ *B02C 25/00* (2013.01); *B02C 21/026* (2013.01); *B02C 2210/01* (2013.01)

(58) Field of Classification Search
CPC ..... B02C 25/00; B02C 2210/01; B02C 23/08; B02C 21/026; B02C 21/00
See application file for complete search history.

(56) References Cited

U.S. PATENT DOCUMENTS 7,957,944 B2 6/2011 Herbst
11,325,133 B1 * 5/2022 Tracy ........................ B02C 4/42
11,925,939 B2 3/2024 Meier et al.
2021/0032041 A1 * 2/2021 Geywitz ................ B02C 23/02

FOREIGN PATENT DOCUMENTS

DE 102020125132 A1 3/2022
WO 2008021040 A1 2/2008
WO WO-2021081584 A1 * 5/2021 ......... F04D 15/0088
WO WO-2022163244 A1 * 8/2022 ............. G01B 17/00

OTHER PUBLICATIONS

Translation of WO-2022163244-A1.*
European Search Report for corresponding patent application No. 24151911.5, dated Jun. 12, 2024, 5 pages (not prior art).

* cited by examiner

*Primary Examiner* — Bobby Yeonjin Kim
(74) *Attorney, Agent, or Firm* — Gary L. Montle; Lucian Wayne Beavers; Patterson Intellectual Property Law, PC

(57) ABSTRACT

A rock processing machine comprises: a material feeding apparatus having a material buffer for loading starting material to be processed; at least one working apparatus of at least one crushing apparatus and/or at least one screening apparatus; at least one conveyor apparatus for conveying material; a data processor including a data memory; a display connected to the data processor in data-transmitting fashion. The data processor ascertains, from data retrievable from the data memory which are based on at least one data collection basis, wear information regarding the wear of a working tool configuration of the at least one working apparatus, ascertains for the wear information, starting from at least one data collection basis, on which at least a portion of the data used for ascertaining the wear information is based, quality information regarding the wear information, and output the wear information and quality information via the display.

20 Claims, 3 Drawing Sheets

ROCK PROCESSING MACHINE WITH WEAR ASSESSMENT AND QUALITATIVE EVALUATION OF THE WEAR ASSESSMENT

CROSS-REFERENCES TO RELATED APPLICATIONS

This application claims benefit of German Patent Application No. 10 2023 101 025.5, filed Jan. 17, 2023, and which is hereby incorporated by reference.

FIELD OF THE INVENTION

The present invention relates generally to rock processing machines, and more particularly to a rock processing machine, which comprises the following as machine components: a material feeding apparatus having a material buffer for loading starting material to be processed; at least one working apparatus of at least one crushing apparatus and at least one screening apparatus; at least one conveyor apparatus for conveying material between two machine components; and an output apparatus for outputting information, wherein a data processing apparatus having a data memory connected to the data processing apparatus in data-transmitting fashion is associated with the rock processing machine, wherein the output apparatus is connected to the data processing apparatus in data-transmitting fashion, and wherein the data processing apparatus is designed to ascertain, from data retrievable from the data memory which are based on at least one data collection basis, wear information regarding a state of wear of a working tool configuration of the at least one working apparatus and to output the wear information by way of the output apparatus.

BACKGROUND

A conventional example of a rock processing system is known from WO 2008/021040 A1.

Due to their physical-abrasive interaction with mineral rock, rock processing machines are subject to above-average wear in comparison to other working machines. This applies particularly to crushing apparatuses as working apparatuses of a rock processing machine, which unlike screening apparatuses not only sort mineral rock on the basis of their mesh aperture by utilizing a relative movement between the rock and the screening apparatus, but which by way of crushing tools exert a force on the rock present in the crushing apparatus that by design exceeds the ultimate strength of the rock. The rock is thereby broken up in the crushing apparatus. Crushing the rock in the crushing apparatus increases the number of rock grains in the rock processing machine and in particular in the crushing apparatus, and the number of wear-advancing sharp break edges in the rock processing machine also increases with the number of rock grains.

In rock processing machines, the operational capacity of a working tool configuration, that is, the ability of a working tool configuration to perform work as intended from the first use until reaching the limit of its usability, essentially depends exclusively on wear since in the operation of the rock processing machine the wear limit of the working tool configuration is normally reached before another event occurs that ends the operational life or the usability of the working tool configuration. For a predictive operation of a rock processing machine, it is therefore helpful to ascertain a state of wear of the working tool configuration in order to plan the further operation and the remaining usage capacity until the next maintenance of the rock processing machine and thus to achieve the highest possible productivity of the rock processing machine.

The rock processing machine known from WO 2008/021040 A1 ascertains a wear model from historical wear data ascertained for the respective working tool configuration and based on this wear model enables the selective ascertainment of wear information and of a wear prediction for the respective working tool configuration. In WO 2008/021040 A1, the data collection basis of the data used for ascertaining the wear information are comparative measurements of the wear on identically constructed working tool configurations in earlier normal uses.

WO 2008/021040 A1 also teaches to measure a remaining thickness of the working tool configuration after a certain operating time and to compare the measured remaining thickness to historical wear data in order to select from multiple historical wear data on the basis of the comparison a historical data series particularly applicable to the respective case or to select quantitatively proximate historical wear data on the basis of the measured remaining thickness and to interpolate from these a data series for the currently considered working tool configuration. The selected or interpolated data series then serves as the basis for calculating wear information about a probably existing state of wear or about a state of wear expected in the future.

WO 2008/021040 A1 further teaches to ascertain a rate of wear starting from the initial thickness of the working tool configuration in the wear-free state, a remaining thickness measured at a point in time after a period of use and the period of use elapsed in the meantime, and to calculate on the basis of the rate of wear a remaining operational capacity in the form of a remaining tool lifetime. Finally, WO 2008/021040 A1 teaches to compare the calculated rate of wear to rates of wear that were ascertained from historical wear data, and, based on the result of the comparison, to modify operating parameters of the rock processing machine if necessary.

Wear predictions ascertained as in the prior art described above are on the one hand only possible if historical wear data actually exist. If these historical wear data exist, however, then the concrete numerical values obtained with the wear predictions often convey a false sense of certainty. In trusting the correctness of the provided numerical values, which in fact are encumbered with uncertainties, predicted wear events then occur earlier than expected, for example, and meet the machine operator unprepared in spite of the prediction or even result in damage to the machine; or maintenance work is initiated too early based on the predictions and thus the working tool configuration is not fully utilized.

SUMMARY

One object of a rock processing system according to the present disclosure may be to provide the operator with wear information by the output apparatus, wherein the operator may be informed about a quality of the ascertained wear information, in particular about its accuracy. It is furthermore desirable to make wear information available independently of the existence of historical wear data. It is then definitely helpful to provide the operator with an indication of the quality of the wear information.

A rock processing machine is disclosed herein, in which a data processing apparatus is furthermore designed to ascertain for the ascertained wear information, starting from at least one data collection basis, on which at least a portion of the data used for ascertaining the wear information is based, quality information regarding the quality of the wear information and to output the quality information by way of the output apparatus.

In principle, this offers the possibility of using data from different data collection bases, not only based on historical data of comparable work uses of a comparable working apparatus, for ascertaining wear information. However, since the quality, in particular the accuracy, of a result ascertained with the available data regarding the state of wear depends heavily on the data collection basis, that is, on the type and/or scope of knowledge bases from which the available data derive, a rock processing machine of the present disclosure is able to output, together with the wear information, quality information associated with the wear information, which indicates how much the operator may justifiably trust the output wear information. This helps to avoid situations in which due to inaccurate wear information the operational capacity of a working apparatus is utilized only very incompletely or in which it is utilized excessively to the point of damaging machine components of the rock processing machine. For example, based on the quality information, a machine operator is able to estimate a time frame, in which and starting at what time he should perform inspections of the working apparatus in order to obtain an instantaneous impression regarding the actual state of wear of the working apparatus and its working tool configuration.

The working apparatus may be a screening apparatus, in which case the working tool configuration is a screen or multiple screens.

Preferably, because it is more exposed to wear, the working apparatus is a crushing apparatus. In this case, the working tool configuration may be a single crushing tool, such as a crushing jaw, an impact wing, a crushing cone, a crushing shell, a blow bar, or a crushing roller. Alternatively, the working tool configuration may be a combination of multiple, for example two, crushing tools, such as crushing jaws, impact wings, crushing cones and crushing shells, crushing rollers or blow bars, which define a crush gap between them.

The operational capacity may be expressed in various units. The tool lifetime is a known unit, which indicates the period of use between the start of the first use of a tool until it is completely worn. However, the operational capacity may also be indicated as a quantity, thus as a mass or as a volume for example, which then indicates the quantity of rock, for example in tons or cubic meters, which is processed by the working tool configuration from its first use until it is completely worn. While in the present application the operational capacity refers to the entire usage capacity of the working tool configuration, the term "remaining operational capacity" indicates the usage capacity remaining from a specific point in time under consideration until the working tool configuration is worn completely. In the unworn state of the working tool configuration, the remaining operational capacity equals the operational capacity.

In principle, it may be provided that the data processing apparatus ascertains and outputs the quality information only based on a subset of the data collection bases of the data used for ascertaining the wear information. It is conceivable, for example, that the most inaccurate data collection basis, or the data collection basis that results in the most inaccurate data, determines the quality information. In order to be able to output the most meaningful quality information, however, it is preferable if the data processing apparatus is designed to ascertain the quality information associated with the ascertained wear information from the at least one data collection basis, from which the data used for ascertaining the wear information derive, and to output this quality information by way of the output apparatus. In this case, if there are multiple applicable data collection bases, all data collection bases are taken into account in the ascertainment of the quality information.

The quality information may be output for example as a specification of a tolerance range or deviation range. Such a tolerance range indicates to what extent the actual state of wear can permissibly deviate from the ascertained state of wear. The tolerance range may be indicated inter alia quantitatively as a percentage deviation or in absolute numbers by its range limits. Furthermore, in a particularly simple and preferred model, the quality information may comprise an assignment of the wear information to an accuracy class from a plurality of different predetermined accuracy classes. It may then be sufficient to indicate an accuracy class associated with the wear information from a plurality of accuracy classes. For this purpose, the accuracy classes may be numbered consecutively or indicated by consecutive letters with regard to their increasing accuracy. As explained above, the accuracy classes may be distinguished quantitatively, but also linguistic-qualitatively, for example as the accuracy classes "high", "medium", "low" and the like, three accuracy classes being mentioned here only by way of example. Preferably, each accuracy class of a group of accuracy classes, particularly preferably of the plurality of accuracy classes, represents a tolerance range of different magnitude, within which a deviation of the actual wear from the output wear information is permissible.

In order to be able to evaluate a state of wear qualitatively or quantitatively, it is helpful if it can be set in relation to a performance capacity, also called "usage capacity" above, of the wear-free working tool configurations. A particularly suitable value for allowing for this relativization is the aforementioned operational capacity, represented by an operational capacity value. Available operational capacity values preferably differ according to the data collection bases, from which they derive.

The data used for ascertaining the wear information therefore preferably comprise an operational capacity value of the working tool configuration, wherein the operational capacity value may be based on at least one of the following distinct data collection bases, listed in an order of increasing accuracy:

i. a general specification of the operational capacity value, and ii. a usage-related specification of the operational capacity value.

The aforementioned possible data collection bases for ascertaining the operational capacity value is only exemplary and not final. Other data collection bases are possible.

A general specification of the operational capacity value is for example an operational capacity value indicated by the manufacturer or by a refurbisher or repairer of the working tool configuration without indication or consideration of usage conditions. Such operational capacity values are normally statistically ascertained or theoretically calculated in a manner not known or verifiable in greater detail. Since they do not take the concrete conditions of the respective usages of the working tool configuration into consideration, that is, for example what type of rock is to be crushed and to what target grain size, generally indicated operational capacity values are not particularly accurate.

More accurate operational capacity values are available if these are indicated in a usage-related manner, that is, by taking into account the conditions of use, such as for example the type of rock, the target grain size, a component upstream of the working tool configuration such as a pre-screen, pre-crusher, upstream crushing apparatus and the like, fill ratio of the working apparatus with rock, type and design of the working tool configuration and/or of the rock processing machine, in which the working tool configuration is used, etc. For ascertaining a usage-based operational capacity, it is possible to use historical data, which identify past uses and the operational capacity reached with each past use.

According to one specific embodiment as disclosed herein, the usage-based operational capacity value for the respective construction type of working tool configurations may be ascertained from data associations of an experience database. For this purpose, the experience database may comprise as data associations a plurality of experiential operational capacities and historical usage conditions associated with these experiential operational capacities, the experiential operational capacity having been reached under the respectively associated historical usage conditions.

Point ii. regarding the data collection basis of the utilized operational capacity value may be further subdivided, for example as a function of how many usage-identifying parameters exist, in order to connect an operational capacity value with a use and its usage conditions. A further subdivision may be performed on the basis of the number of different historical uses, for which historical usage data and associated operational capacity values exist. Thus, it is easy to see that an operational capacity value for the working tool configuration under consideration, which is based on a plurality of different historical uses, for each of which there exists a plurality of parameters identifying the respective use, has a higher reliability and accuracy for the comparison with the current use for which the wear information is being ascertained than an operational capacity value, the data collection basis of which comprises a lower number of historical uses or the data collection basis of which comprises indeed an equal number of historical uses, which, however, are identified by a lower number of usage data. The reliability and accuracy are definitely lower when the data collection basis of the operational capacity value has both a lower number of historical uses as well as a lower number of usage data for each historical use for identifying the latter.

A further important factor influencing the ascertainment of a state of wear is the load causing the wear during the use of the working tool configuration. The data used for ascertaining the wear information therefore preferably comprise a load value representing the usage load of the working tool configuration, wherein the load value may be based on at least one of the following data collection bases, listed in an order of increasing accuracy: a period of use elapsed since the wear-free working tool configuration entered into use; a usage quantity processed since the wear-free working tool configuration entered into use; and a usage load time or a usage load quantity as a period of use or usage quantity taking into account load effects that occurred during the use.

According to one specific embodiment as disclosed herein, the data processing apparatus may be designed to ascertain the usage load time or the usage load quantity as a period of use or usage quantity corrected by load effects, which occurred during the use, from the elapsed usage time and/or the processed usage quantity on the one hand and from usage data on the other hand, the usage data representing usage conditions under which the working tool configuration is used during its period of use so far.

This list of possible data collection bases of the load value is also not complete or final.

Here, it is first assumed that an ascertained usage time allows for a less accurate statement about the load of the working tool configurations than an ascertained usage quantity, for the mere time lapse of a use provides no information about the utilization of the working apparatus and thus about the wear-causing load of the working tool configuration. An even greater accuracy in the ascertainment of the load is achieved by including usage data, as already mentioned above by way of example. Thus it makes a difference whether hard, sharp-edged rock or soft, edgeless rock was processed over the ascertained usage time and whether the fed starting material was merely coarsely crushed or fragmented into a finer granulation. These usage data may be applied accordingly also to the usage quantity. Thus, it is also possible to ascertain from the usage time or usage quantity, weighted by or corrected by the usage data of the at least one past use, a usage load time, or a usage load quantity, which represents the wear-related load more accurately than the mere usage quantity or the mere usage time. In this manner, for example, a usage time or usage quantity may be converted to a fictitious usage, which forms the basis of the ascertainment of the tool lifetime or quantity or of a merely generally indicated operational capacity of the working tool configurations.

A piece of wear information may advantageously be an indication of a remaining operational capacity, which is ascertained for example on the basis of a difference between the operational capacity of the wear-free working tool configuration and the ascertained load value, whether it is now in relation to the time or to the quantity and further whether it is by taking usage data into consideration or without such a consideration.

Again, the output quality information may depend on the type and/or the scope of the available data collection bases, described above, for determining the load value.

For a particularly high accuracy in the ascertainment of the state of wear of the working tool configuration, the rock processing machine preferably comprises a wear ascertainment system.

Based on the possibility, already described above, of sorting different data collection bases of the load value according to increasing accuracy, the load value may be derived from the following data collection basis in the already started sequence of increasing accuracy: an ascertained range of motion of the working tool configuration, the range of motion changing as a function of the state of wear of the working tool configuration.

The wear ascertainment system may comprise for example an adjusting apparatus of the working tool system itself, by which the working tool configuration is adjustable relative to the machine frame. This is relevant especially for at least one crushing tool as the working tool configuration, since for a so-called zero-point determination, the at least one crushing tool of a crushing apparatus as the working tool configuration is moved until the crush gap associated with the working tool configuration is zero. Depending on the degree of wear of the working tool configuration, the adjusting path for an operating position with a crush gap width of zero varies in length or at the end of the adjusting movement a location is reached that differs from an original location of the wear-free working tool configuration. Thus, for example, a comparatively accurate impression of the state of wear may be obtained and output as wear information, or taken into account for ascertaining the wear information, as a function of a path traveled in the zero-point determination or as a function of the location of the working tool configuration reached in the process.

For an even more accurate ascertainment of the state of wear, the rock processing machine may include a wear sensor system for sensorially ascertaining a state of wear of the working tool configuration. In principle, the previously mentioned wear ascertainment system is also a kind of wear sensor system, which allows for a quantitative determination of the wear of the working tool configuration. In contrast to the more general wear ascertainment system, the wear sensor system indicated here refers to the fact that at least one dedicated sensor is provided, which sensorially acquires the state of wear of the working tool configuration.

In the already started sequence of increasing accuracy, the load value may consequently be based on the following data collection basis: wear sensor data sensorially acquired at the working tool configuration.

Such a wear sensor system may comprise a camera for optically capturing the working tool configuration and its wear and/or may comprise a probe element, using which the position of a wear-related outer surface of the working tool configuration is ascertained by physical contact and/or may comprise a wear element built into the working tool configuration, which is situated at a predetermined wear limit and the destruction of which by wear triggers a signal that indicates that the wear limit associated with the wear element has been reached. Further wear sensors may be used additionally or alternatively.

As was explained in detail above, the individual accuracy classes of the plurality of accuracy classes may differ from one another in terms of the data collection bases of the operational capacity value and/or of the load value. The ascertained wear information preferably indicates a remaining operational capacity until an operation-limiting wear limit is reached.

The working apparatus is preferably a crushing apparatus, which is normally subjected to a much higher wear load than a screening apparatus. According to a development already indicated above in connection with the zero-point determination, a control apparatus of the rock processing machine may be designed to change a crush gap width of a crush gap between two crushing tools as the working tool configuration of the crushing apparatus by displacing at least one crushing tool relative to the other crushing tool contributing to the formation of the crush gap. The control apparatus is then preferably designed to ascertain wear information with respect to a state of wear of the working tool configuration by changing the crush gap to a crush gap width of zero. The wear ascertainment system therefore preferably comprises the control apparatus.

The crushing apparatus may be any known crushing apparatus, for example an impact crusher or a jaw crusher or a cone crusher or a roll crusher. If the rock processing machine has more than one crushing apparatus, these crushing apparatuses may be crushing apparatuses of the same kind or of different kinds. Each individual crushing apparatus may be one of the aforementioned crusher types: impact crusher, jaw crusher, cone crusher and roll crusher.

The control apparatus is preferably designed for information input by a machine operator or another person, for example a job site coordinator, or for automated information input or information transmission by a data processing system, for example by a maintenance computer for technical monitoring located remotely from the rock processing machine. For this purpose, a preferred development of the present invention may provide for the rock processing machine to comprise an input apparatus for inputting information, the input apparatus being connected in signal-transmitting fashion to the control apparatus for transmitting information.

The input apparatus may be any input apparatus, such as a keyboard, a touch screen, and the like. The input apparatus may therefore be developed in combination with the output apparatus as an input/output apparatus. The input apparatus may also be connected to the control apparatus in signal-transmitting fashion via a wired link or a radio link, so that it is not necessary for it to be physically present on the rock processing machine. A signal-transmitting connection of the input apparatus or also of the wear sensor system to the control apparatus may also be a connection by interposition of the data memory, in which information input into the input apparatus and/or information output by the wear sensor system explained in more detail below is stored as data and is retrieved as stored data by the control apparatus. The input apparatus and/or the wear sensor system may also be connected directly to the data memory in signal-transmitting fashion, so that the input apparatus is able to transmit information input into it as directly into the data memory for storage as the wear sensor system is able to transmit results of its detection operation.

In response to a request by an operator or a cooperating data processing system via the input apparatus, the wear information may be output according to a predetermined schedule or continuously during operation.

Data, which do not change over the operational life of the rock processing machine or which can be changed only with great effort, for example via the machine configuration of the rock processing machine and its components, may be stored permanently in the data memory and may be stored for example by the manufacturer of the rock processing machine during the manufacture of the same or prior to its delivery. Nevertheless, if the machine configuration should change, for example in the course of maintenance or repair, the service provider performing the maintenance or repair work is able to make appropriate changes to the content of the data memory.

The data memory may be connected to the control apparatus in signal-transmitting fashion by a physical signal line and/or wirelessly, for example by a radio link or by the transmission of optical signals. In principle, the data memory may therefore be provided separately and at a distance from the rest of the rock processing machine. The "rest of the rock processing machine" is here represented by its machine body. The machine body comprises the machine frame and all components of the rock processing machine connected to the machine frame, even when these are connected so as to be movable relative to the machine frame.

The control apparatus may be developed separately of the aforementioned data processing apparatus or may comprise or be the data processing apparatus in order to keep the number of components required for operating the rock processing machines low. If the control apparatus is developed separately of the data processing apparatus, then the control apparatus is preferably connected to the data processing apparatus in data-transmitting fashion so that the control apparatus and the data processing apparatus are able to exchange data between each other. The control apparatus and/or the data processing apparatus preferably comprise(s) at least one integrated circuit, such as for example a CPU with connected electronic peripherals, for example comprising storage modules, data buses and the like.

The allocation of the data processing apparatus to the presented rock processing machine is at least an allocation in terms of data transmission such that the data processing apparatus is able to exchange data with the rock processing machine. For this purpose, at least one suitable transmitting and receiving unit may be situated on the rock processing machine for the, preferably bidirectional, data transmission to and from the data processing apparatus. The at least one transmitting and receiving unit is able to transmit data by cable or wire, if the data is transmitted via physical data lines to the rock processing machine, for example to its control apparatus, in data-transmitting fashion. The data processing apparatus is then normally a machine component of the rock processing machine. In the preferred case, in which the rock processing machine is designed to be self-propelled, the data processing apparatus as a machine component is always carried along by the rock processing machine. The allocation of the data processing apparatus to the rock processing machine is then also a spatial and a kinematic allocation in addition to the allocation in terms of data transmission.

It is also possible, however, that the data processing apparatus is situated spatially distant from the rock processing apparatus and associated with the latter only in terms of data transmission. Such a data processing apparatus may be implemented as a so-called "cloud" solution, for example as a distributed CPU network, or by a dedicated computing center. The data processing apparatus may be connected to the rock processing machine in data-transmitting fashion by at least one wireless data transmission link, it being possible for the rock processing machine to have, if required, a suitable transmitting and receiving unit for the, preferably bidirectional, wireless data transmission. As a distributed data processing apparatus, the data processing apparatus may include a plurality of partial data processing apparatuses, of which at least two may be situated at different locations.

What was said previously about the data processing apparatus also applies mutatis mutandis to the data memory connected in data-transmitting fashion to the data processing apparatus. The data memory may also be situated and in particular carried along as a machine component on the rock processing machine or it may be located with respect to at least one location spatially distant from the rock processing machine.

For practical considerations, preferably one data memory is always present on the rock processing apparatus in order to be able to store data at least temporarily on the rock processing apparatus. A data memory cooperating with the control apparatus may also be the data memory of the data processing apparatus.

Based on the quality information, the data processing apparatus is preferably able to ascertain and output time information for performing a future inspection of the working tool configuration. The machine operator is thus able to recognize how long he can continue to work without a further inspection of the working tool configuration before entering into an operating phase, in which a one-time or regularly recurring inspection of the working tool configuration regarding its state of wear is necessary or at least advisable.

Additionally or alternatively, the data processing apparatus may output as the wear information a state of wear predicted for a future operating time.

For this advantageous further development of the present invention, the wear ascertainment system and/or the wear sensor system may ascertain a state of wear of the working tool configuration within a predetermined time span after reaching the originally future operating time and transmit the state of wear to the data processing apparatus. In an advantageous development of the present invention, the data processing apparatus may ascertain the quality information based on a comparison of the predicted state of wear with the ascertained state of wear and/or it may ascertain and output time information for performing a future inspection of the working tool configuration.

For illustration, a merely exemplary specific embodiment shall be outlined as follows: The data processing apparatus may use a first predetermined accuracy class, which has a first tolerance range, the first accuracy class being associated with a data collection basis, which comprises an operational capacity value of the working tool configuration generally indicated for the working tool configuration and the period of use of the working tool configuration so far, the data collection basis being free of usage data, which represent the usage conditions, under which the working tool configuration is used during its period of use so far.

The data processing apparatus may use a second predetermined accuracy class, which has a second tolerance range, the second accuracy class being associated with a data collection basis, which comprises an operational capacity of the working tool configuration generally indicated by a supplier of the working tool configuration, the period of use of the working tool configuration so far and usage data, the usage data representing usage conditions, under which the working tool configuration was used during its period of use so far.

The data processing apparatus may use a third predetermined accuracy class, which has a third tolerance range, the third accuracy class being associated with a data collection basis, which comprises a usage-based operational capacity value of the working tool configuration, which is ascertained for the respective construction type of working tool configurations from data associations of an experience database, the experience database comprising as data associations a plurality of experiential operational capacity values and historical usage conditions associated with these experiential operational capacity values, the experiential operational capacity value having been reached under the respectively associated historical usage condition.

The data processing apparatus may use a fourth predetermined accuracy class, which has a fourth tolerance range, the fourth accuracy class comprising with respect to the ascertainment of the operational capacity value the same data collection basis as the third accuracy class. With respect to the ascertainment of the load value, however, the fourth accuracy class is associated with a data collection basis, which comprises wear sensor data sensorially acquired at the working tool configuration.

Of the exemplary embodiments described above and mentioned merely by way of example, the accuracy of the quality classes increases steadily from the first to the fourth, i.e., the respectively associated first to fourth tolerance range of the wear information decreases with increasing numbering.

The rock processing machine discussed here is preferably a self-propelled rock processing machine having a travel gear, which allows the rock processing machine to change its location of installation in self-propelled fashion and/or to move in self-propelled fashion between a location of installation for a rock processing operation and a transport means for transporting the rock processing machine. Because of the normally high weight of the mobile, in particular self-propelled, rock processing machine, the travel gear is usually a crawler travel gear, although a wheel travel gear is not to be ruled out as an alternative or addition to a crawler travel gear.

BRIEF DESCRIPTION OF THE SEVERAL VIEWS OF THE DRAWINGS

The invention will be explained in greater detail below with reference to the enclosed drawings.

DETAILED DESCRIPTION

Figure 1:
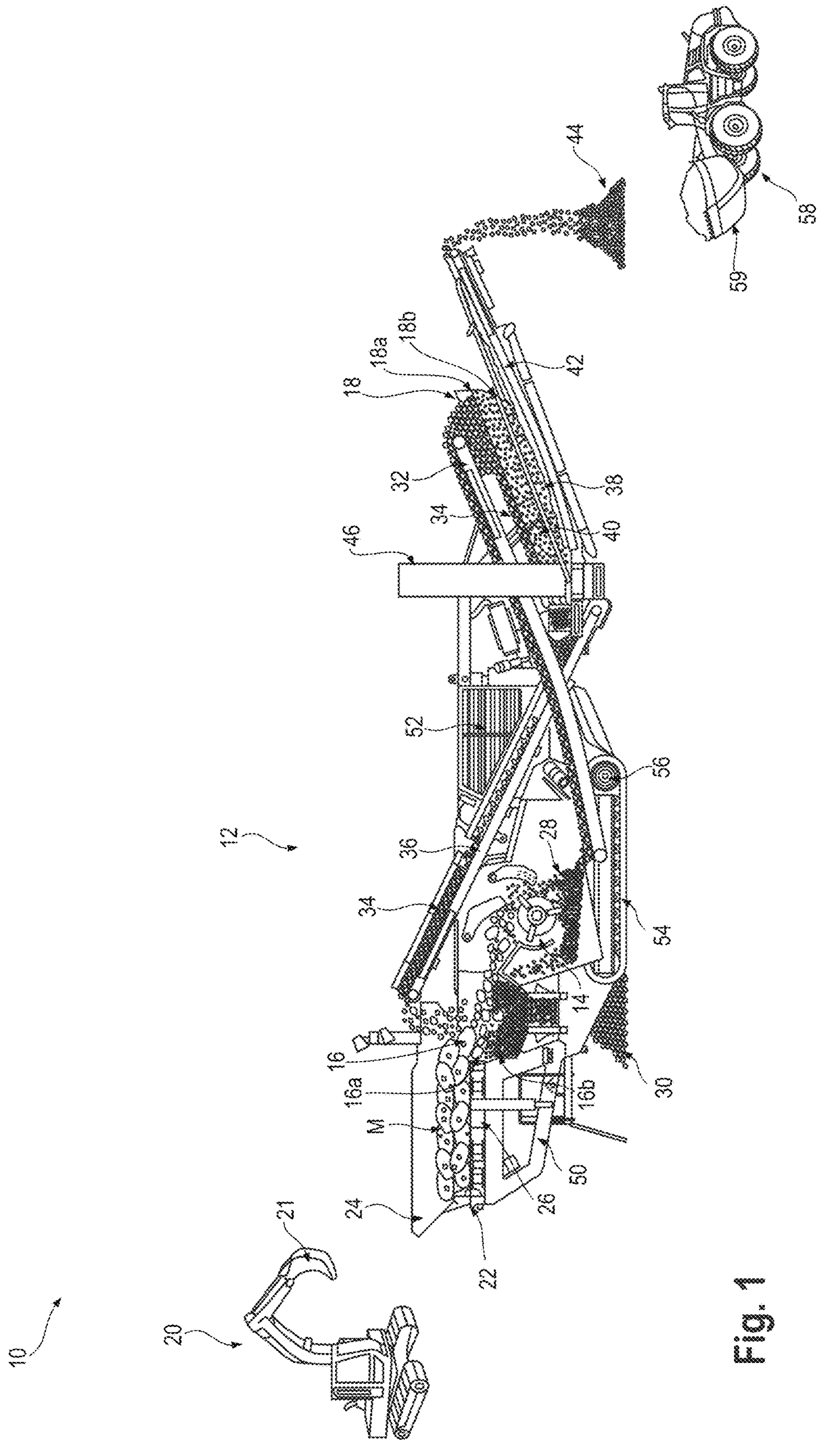
FIG. 1 shows a rough schematic view of a job site with a specific embodiment of a rock processing machine according to the present disclosure.

A job site is generally denoted by 10 in FIG. 1. The central implement of the job site 10 is a rock processing machine 12 comprising an impact crusher 14 as a crushing apparatus and a pre-screen 16 as well as a post-screen 18 as screening apparatuses. The job site is in the present case preferably a rock quarry, but may also be a recycling yard or a demolition site of one or multiple buildings.

Mineral material M to be processed by the rock processing machine 12, that is, to be sorted according to size and to be crushed, is fed discontinuously by being loaded by a backhoe 20 as a loading apparatus of the rock processing machine 12 into a material feeding apparatus 22 having a funnel-shaped material buffer 24.

From the material feeding apparatus 22, a vibrating conveyor in the form of a trough conveyor 26 conveys the material M to the pre-screen 16, which comprises two pre-screen decks 16*a* and 16*b*, of which the upper pre-screen deck 16*a* has a greater mesh aperture and separates and feeds to the impact crusher 14 those grain sizes that require crushing according to the respective specifications for the final grain product to be obtained.

Grains falling through the upper pre-screen deck 16*a* are sorted further by the lower pre-screen deck 16*b* into a usable grain fraction 28, which corresponds to the specifications of the final grain product to be obtained and an undersize grain fraction 30, which has a grain size that is so small that it is unusable as value grain in the illustrated example.

The number of stockpiles or fractions shown in the exemplary embodiment is provided merely by way of example. The number may be greater or smaller than indicated in the example. Moreover, the undersize grain fraction 30 explained in the present example as waste could also be a value grain fraction if the grain size range accruing in the fraction 30 is usable for further applications.

The usable grain fraction 28 is increased by the crushed material output by the impact crusher 14 and is conveyed to the post-screen 18 by a first conveyor apparatus 32 in the form of a belt conveyor. In the illustrated exemplary embodiment, the post-screen 18 also has two screen decks or post-screen decks 18*a* and 18*b*, of which the upper post-screen deck 18*a* has the greater mesh aperture. The upper post-screen deck 18*a* allows value grain to fall through its mesh and sorts out an oversize grain fraction 34 having a grain size that is greater than the greatest desired grain size of the value grain. The oversize grain fraction 34 is returned by an oversize grain conveyor apparatus 36 into the material input of the impact crusher 14 or into the pre-screen 16. In the illustrated exemplary embodiment, the oversize grain conveyor apparatus 36 takes the form of a belt conveyor.

The useful grain of the useful grain fraction 28 thus comprises oversize grain and value grain. In contrast to the illustration in the exemplary embodiment, the oversize grain conveyor apparatus 36 may also be swiveled outward from a machine frame 50 of the rock processing apparatus 12, so that the oversize grain fraction 34 is stockpiled instead of being returned.

The value grain that fell through the meshes of the upper post-screen deck 18*a* is fractionated further by the lower post-screen deck 18*b* into a fine grain fraction 38 having a smaller grain size and an medium grain fraction 40 having a greater grain size.

Via a fine grain discharge conveyor apparatus 42 in the form of a belt conveyor, the fine grain fraction 38 is heaped to build a fine grain stockpile 44.

Figure 2:
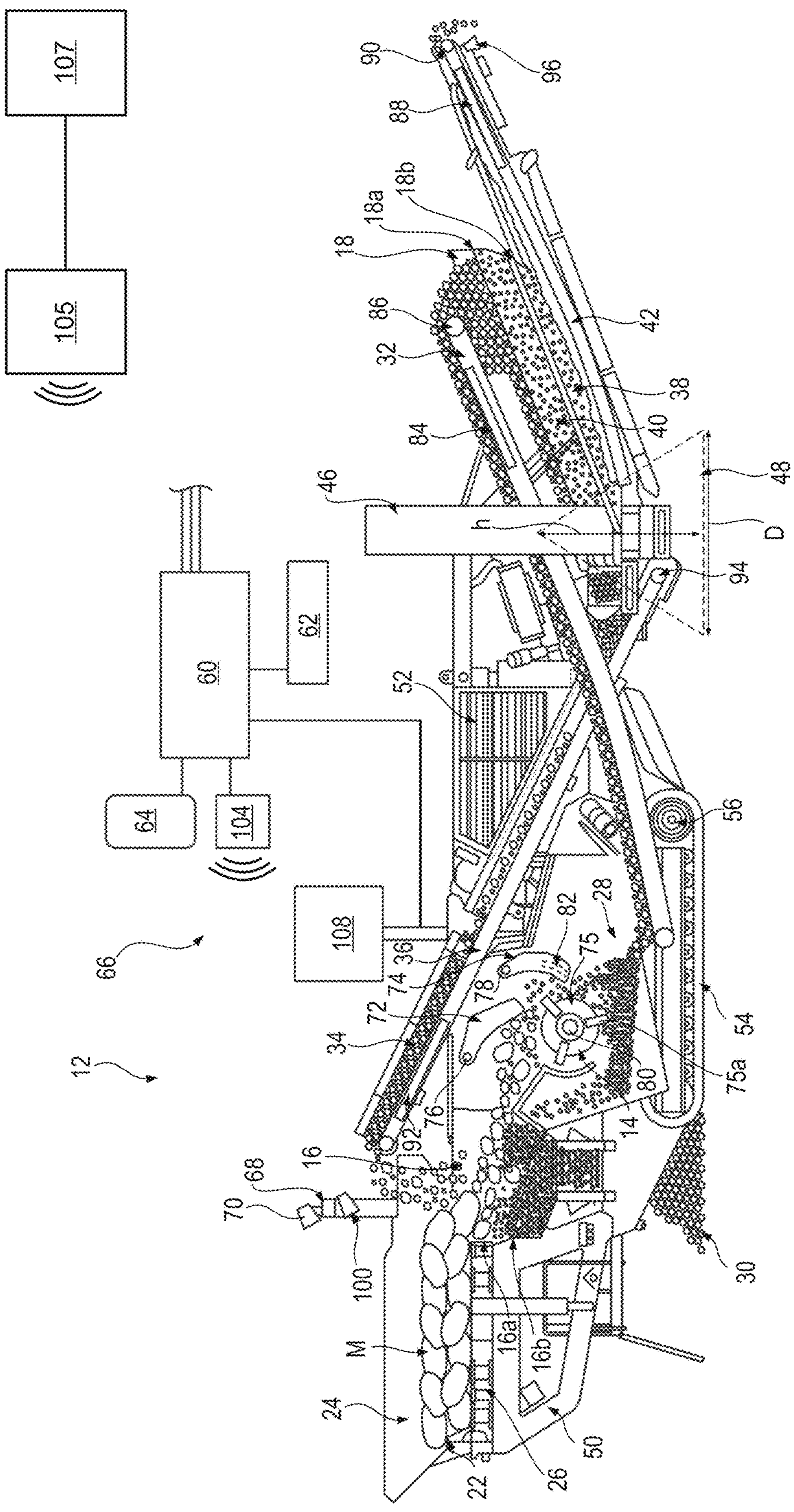
FIG. 2 shows the rock processing machine of FIG. 1 in an enlarged schematic lateral view.

Via a medium grain discharge conveyor apparatus 46, likewise in the form of a belt conveyor, the medium grain fraction 40 is heaped to build a medium grain stockpile 48 (not shown in FIG. 1 and shown only in rough schematic fashion in FIG. 2).

As a central structure, the rock processing machine 12 has a machine frame 50, on which the mentioned machine components are fastened or supported directly or indirectly. As central power source, the rock processing machine 12 has a diesel combustion engine 52 supported on the machine frame 50, which generates the entire energy consumed by the rock processing machine 12, unless it is stored in energy stores such as batteries, for example. Additionally, the rock processing machine 12 may be connected to job site electrical current, if provided on the job site.

In the illustrated example, the rock processing machine 12, which may be part of a rock processing system having a plurality of rock processing machines situated in a common flow of material, is a mobile, more precisely a self-propelled, rock processing machine 12 having a crawler travel gear 54, which via hydraulic motors 56 as drive of the rock processing machine 12 allows for a self-propelled change of location without an external towing vehicle.

A reduction of the value grain stockpiles 44 and 48 and of the stockpile of the undersize grain fraction 30 occurs discontinuously by one or several wheel loaders 58 as an example of a removal apparatus. The stockpile of the undersize grain fraction 30 must also be reduced regularly in order to ensure an uninterrupted operation of the rock processing machine 12.

For an operational control that is as advantageous as possible, the rock processing machine 12 includes the machine components described below with reference to the larger illustration of FIG. 2.

The rock processing machine 12 comprises a control apparatus 60, for example in the form of an electronic data processing apparatus with integrated circuits, which controls the operation of machine components. For this purpose, the control apparatus 60 may either control drives of machine components directly, for example, or may control actuators which in turn are able to move components.

The control apparatus 60 is connected to a data memory 62 in signal-transmitting fashion for exchanging data and is connected wirelessly or by cable to an input apparatus 64 for inputting information. Via the input apparatus 64, for example a touchscreen, a tablet computer, a keyboard and the like, information may be input into the input apparatus 64 and may be stored by the latter in the data memory 62.

The control apparatus 60 is furthermore connected in signal-transmitting fashion to an output apparatus 66 in order to output information.

For obtaining information about its operating state, the rock processing machine 12 furthermore has diverse sensors, which are connected in signal-transmitting fashion to the control apparatus 60 and thus in the illustrated example indirectly to the data memory 62. For better clarity, the sensors are shown only in FIG. 2.

A camera 70 is situated on a supporting frame 68, which records images of the material feeding apparatus 22 with the material buffer 24 and transmits these to the control apparatus 60 for image processing. With the aid of camera 70 and by processing the images it records of the material buffer 24 and of the material feeding apparatus 22, the control apparatus ascertains a local fill ratio of the material buffer 24 by using data relationships stored in the data memory 22.

Furthermore, a vibration amplitude and vibration frequency of the drive (not shown) of the trough conveyor 26 are detected and transmitted to the control apparatus 60, which ascertains from this information a conveying speed of the trough conveyor 26 and ascertains a conveying capacity of the trough conveyor 26 toward the impact crusher 14 by considering the local fill ratio of the material buffer 24.

With the aid of predetermined data relationships, generated and/or developed by methods of artificial intelligence, the control apparatus 60 is able to detect from image information of camera 70 a grain size distribution in the material M in the material buffer 24 and even detect the type of material.

In impact crusher 14, an upper impact wing 72 and a lower impact wing 74 are situated as crushing tools in a manner known per se, the rotational position of the upper impact wing 72 being detected by a rotational position sensor 76 and the rotational position of the lower impact wing 74 being detected by a rotational position sensor 78 and being transmitted to the control apparatus 60. Via the rotational position sensors 76 and 78, the control apparatus 60 is also able to ascertain a crush gap width of an upper crush gap on the upper impact wing 72 and a crush gap width of a lower crush gap on the lower impact wing 74.

By way of the rotational position sensors 76 and 78, it is possible to ascertain a state of wear of the impact crusher 14 as the working apparatus of the rock processing machine in the course of a zero-point determination customary for the illustrated construction type of rock processing machine 12. For this purpose, a crush gap width in the upper and in the lower crush gap is respectively set to zero, i.e., the impact wings 72 and 74 are moved to make physical contact with the impact bars **75*a* (for better clarity only one impact bar is provided with reference sign "75a") of the central crushing rotor 75. Based on the resulting wear-dependent rotational position of the impact wings 72 and 74, it is possible to draw quantitative and/or qualitative inferences regarding the state of wear of the impact wings 72 and 74 as well as of the impact bars 75*a* in the crushing rotor 75**.

Hence, the rotational position sensors 76 and 78 form together with the control apparatus 60 a wear ascertainment system in the sense of the above description introduction.

A speed sensor 80 ascertains the speed of the crushing rotor of the impact crusher 14 and transmits it to the control apparatus 60.

On components such as blow bars, impact wings, impact plates and impact bars as crushing tool configurations for example, which are particularly subject to wear, wear sensors may be provided which register wear progress, normally in wear stages, and transmit this information to the control apparatus 60. In the illustrated example, for better clarity, a wear sensor system 82 is shown only on the lower impact wing 74. A wear sensor system is preferably also provided on the upper impact wing 72.

In the first conveyor apparatus 32, a first belt scale 84 is situated, which detects the weight or the mass of the material of the useful grain fraction 28 transported across it on the first conveyor apparatus 32. Via a speed sensor 86 in a deflection pulley of the conveyor belt of the first conveyor apparatus 32, the control apparatus 60 is able to ascertain a conveying speed of the first conveyor apparatus 32 and in joint consideration with the detection signals of the first belt scale 84 is able to ascertain a conveying capacity of the first conveyor apparatus 32.

A second belt scale 88 is situated in the fine grain discharge conveyor apparatus 42 and detects the mass or the weight of the fine grain of the fine grain fraction 38 moved across it on the belt of the fine grain discharge conveyor apparatus 42. In the same way, via the speed sensor 90 in a deflection pulley of the conveyor belt of the fine grain discharge conveyor apparatus 42, a conveying speed of the fine grain discharge conveyor apparatus 42 and in joint consideration with the detection signals of the second belt scale 88, a conveying capacity of the fine grain discharge conveyor apparatus 42 can be ascertained by the control apparatus 60.

A third belt scale 92 is situated in the oversize grain conveyor apparatus 36 and ascertains the weight or the mass of the oversize grain of the oversize grain fraction 34 conveyed across it on the oversize grain conveyor apparatus 36. A speed sensor 94 of a deflection pulley of the conveyor belt of the oversize grain conveyor apparatus 36 ascertains the conveying speed of the oversize grain conveyor apparatus 36 and transmits it to the control apparatus 60, which in joint consideration with the detection signals of the third belt scale 92 is able to ascertain a conveying capacity of the oversize grain conveyor apparatus.

At the discharge-side longitudinal end of the fine grain discharge conveyor apparatus 42, a first stockpile sensor 96 is situated, which as a camera records images of the fine grain stockpile 44 and transmits these as image information to a control apparatus 60. The control apparatus detects contours of the fine grain stockpile 48 by image processing and based on the known image data of the camera of the first stockpile sensor 96 starting from the detected contours ascertains a shape and from that a volume of the fine grain stockpile 48. For this purpose, to simplify its information ascertainment, the control apparatus 60 may assume an ideal conical shape of the fine grain stockpile 48 and ascertain the volume of an ideal cone approximating the real fine grain stockpile 48 without excessive error. Thus, it may suffice if a stockpile sensor ascertains the diameter D of the base area of a stockpile and the height h of the stockpile, as is shown in FIG. 2 of stockpile 48.

Each discharge conveyor apparatus producing a stockpile preferably has at least one stockpile sensor or at least cooperates with a stockpile sensor.

The other discharge conveyor apparatuses, such as the medium grain discharge apparatus 46 and an undersize grain discharge apparatus 29, preferably also have belt scale and a speed sensor for detecting the quantity of material transported on the respective conveyor apparatus, the conveying speed and hence the conveying capacity.

The control apparatus 60 is connected in data-transmitting fashion to a transmitting/receiving unit 104, which is designed for wireless data transmission in a suitable data protocol with a communication apparatus 105. The communication apparatus 105 may be situated at a distance from the rock processing machine 12 and may itself in turn be connected in data and signal-transmitting fashion to a spatially remote database and/or electronic data processing system 107. Data that are not available in data memory 62 may thus be retrieved by the control apparatus 60 via the transmitting/receiving unit 104.

The control apparatus 60 and with it the output apparatus 66 have a display apparatus 108, for example in the form of a monitor, for outputting data in the form of graphics and text.

Figure 3:
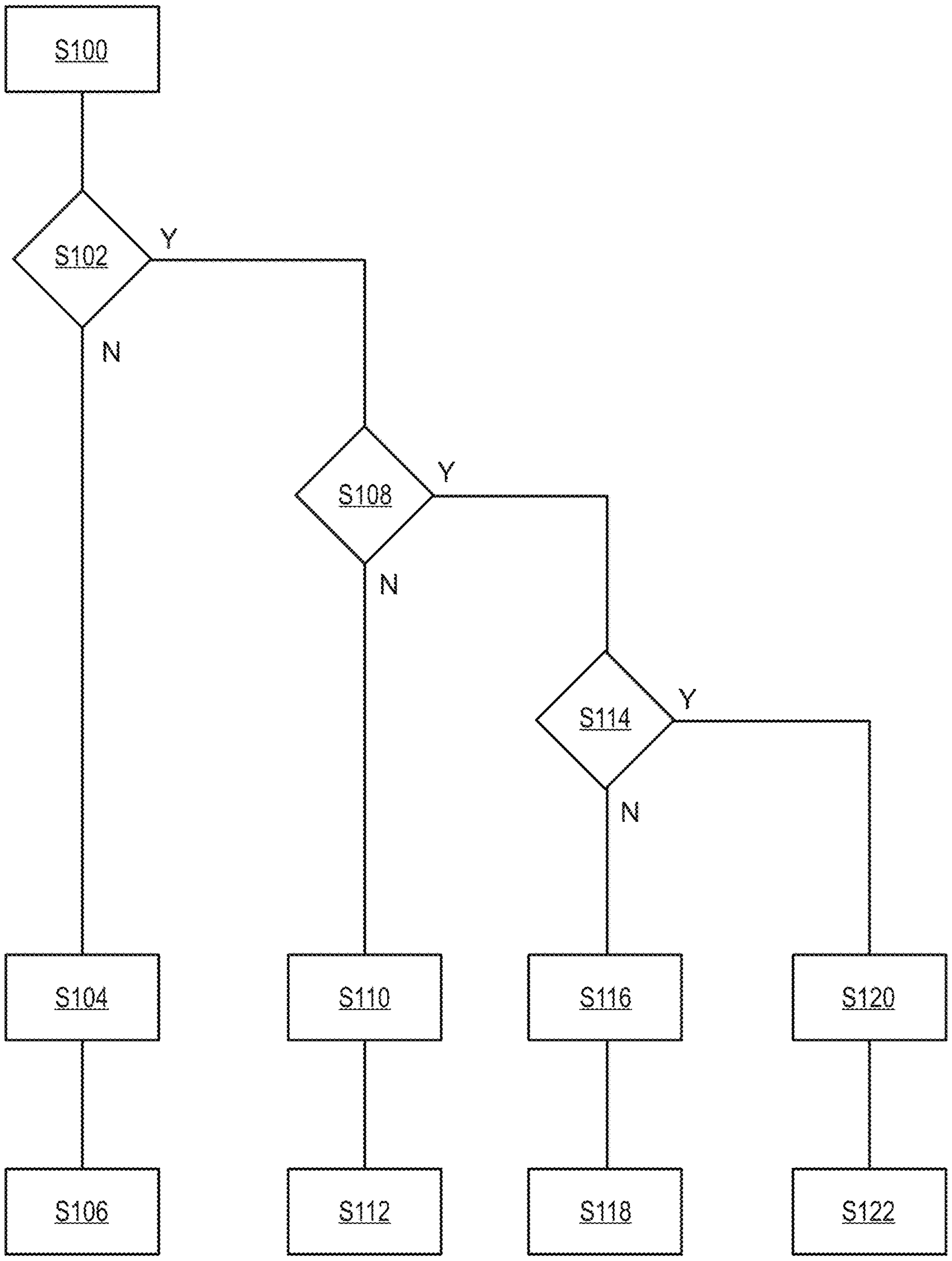
FIG. 3 shows an exemplary process for ascertaining a remaining tool lifetime on the rock processing machine of FIGS. 1 and 2.

An exemplary method for ascertaining wear information and quality information associated with the wear information for the impact crusher 14 as the working apparatus of the rock processing machine 12 of FIGS. 1 and 2 is explained below in connection with FIG. 3.

The method starts in step S100, for example because an operator has input a request for the output of wear information in the form of a remaining tool lifetime via the input apparatus 64 into control apparatus 60 or because due to the expiration of a predetermined time span an ascertainment of wear information is triggered in automated fashion or because such wear information is continuously ascertained in operation.

In step S102, the control apparatus 60, which in the present case is a data processing apparatus in the sense of the description introduction, ascertains whether usage-related data exist for ascertaining wear information about the state of wear of the impact crusher 14.

If no usage-related data exist, the ascertainment method continues with step S104 and ascertains wear information about the remaining tool lifetime from manufacturer data generally stored in the data memory 62 via a tool lifetime, statistically averaged or theoretically calculated from constructional data, as the operational capacity of the crushing tool configurations used in the impact crusher 14, comprising the upper and the lower impact wing 72 and 74, respectively, as well as the impact bars 75*a* of the crushing rotor 75, and the period of use elapsed since the installation of the crushing tool configurations as the difference between the tool lifetime and the period of use.

The method then continues with step S106, in which the thus ascertained remaining tool lifetime is output to the operator together with the quality information "low accuracy" via the display apparatus 108. The quality information is linked to the quality of the available data about the crushing tool configurations. Whenever usage data are not available and one must rely merely on generally provided manufacturer data or data of a tool repairer, the information is output that the ascertained remaining tool lifetime has the lowest possible accuracy or is associated with the predetermined quality class having the lowest accuracy.

Then, if it is determined in step S102 that usage data are available, a check is performed in step S108 to determine whether or not the usage data for the concretely working rock processing machine 12 are based on a predetermined threshold number of usage events.

If the number of usage events for the usage data of the concrete rock processing machine 12 does not reach the threshold number, the control apparatus 60 in step S110 ascertains from the available usage data a tool lifetime and a usage load time for the crushing tool configurations used in the impact crusher 14 of the rock processing machine 12. The tool lifetime is thus based on practical experiences from earlier uses, which are statistically only moderately supported due to the low number of usage events. The usage load time is based on the elapsed usage time, as in the previous case, which, however, on account of the usage data is corrected upward or downward depending on the intensity of the operational use in order to take into account the use-specific usage load of the crushing tool configurations.

In step S112, the control apparatus 60 then outputs via the display apparatus 108 the wear information in the form of the ascertained remaining tool lifetime as the difference between the ascertained tool lifetime and the ascertained usage load time. Because of the data on which this ascertainment is based or the data collection bases on which these data in turn are based, the control apparatus 60 outputs in step S112 together with the ascertained remaining tool lifetime the quality information "medium-low accuracy". Although due to their type, namely as experiential data from earlier usage events, the available data are based on a more accurate data collection basis than in the previously described case, the scope of the data collection basis is not sufficient for an assignment to an even higher accuracy class.

However, if the check in step S108 determines that usage data exist based on a number of earlier usage events that is higher than the predetermined threshold number, then a check is performed in step S114 to determine whether or not wear data ascertained by a wear ascertainment system or by a wear sensor system exist in the rock processing machine 12.

If no wear data directly ascertained in the rock processing machine 12 exist, the remaining tool lifetime is ascertained in step S116 as before in step S110. In step S118, the control apparatus 60 outputs via the display apparatus 108 the ascertained remaining tool lifetime together with the quality information "medium-high accuracy". Since due to the manner of their collection the same data exist as in step S110, the remaining tool lifetime is calculated in step S116 in the same way as in step S110. However, since the scope of the data collection basis is greater than in step S110, due to the higher number of earlier usage events on which the usage data are based, the now ascertained remaining tool lifetime is assigned to a next-higher quality class.

If the check in step S114 results in the determination that wear data ascertained directly at the rock processing machine 12 itself exist, which is the case for the rock processing machine 12 of FIGS. 1 and 2 due to the described sensor system, the remaining tool lifetime is ascertained in step S120 for example based on the state of wear ascertained most recently by the wear ascertainment system or the wear sensor system and further based on the usage load acting on the crushing tool configurations since this last point in time and the usage load time determined therefrom.

For example, a most recent zero-point ascertainment 40 hours prior to the check of the remaining tool lifetime according to step S100 yielded the result that the crushing tool configurations were worn by 13% compared to their unworn state. During these last 40 hours, the rock processing machine crushed demolished concrete to a maximum grain size of the final grain product of 45 mm. From these data, the control apparatus 60 ascertains in step S120 that the last 40 usage hours resulted in further wear of 21 percentage points relative to the unworn initial state. All in all, the crushing tool configurations are therefore worn by 34%, which at an initial tool lifetime of 210 hours results in a remaining tool lifetime of 139 hours.

Alternatively, the calculation can also be performed in such a way that from a tool lifetime of 210 hours of the crushing tool configurations, a calculated wear of 27 usage hours was ascertained during the most recent sensorial ascertainment. The usage data for the past 40 hours result in a usage load time, corrected based on the usage load, of 44 hours, so that the past total load, when taking into account the last wear ascertainment and the further usage load since then, is 27+44=71 hours. Consequently, this time-based calculation route also results in a remaining tool lifetime of 139 hours.

In step S122, the control apparatus 60 outputs the remaining tool lifetime of 139 hours via the display apparatus 108 together with the quality information "high accuracy" via the display apparatus 108. The accuracy class "high accuracy" is always assigned when a state of wear, ascertained at the working apparatus, that is, here the impact crusher 14, of the concrete rock processing machine 12, together with usage data based on a high number of previous usage events are available in order to ascertain a remaining operational capacity.

The present exemplary embodiment is merely illustrative and may be subdivided further. For example, the check regarding the data collection bases may already be branched out earlier, for example to determine whether or not a state of wear ascertained via a wear ascertainment system or a wear sensor system is available. The issue whether a state of wear is ascertainable by on-board means of the rock processing machine 12 is normally independent of the number of usage events on which historical usage data of the same or constructionally identical crushing tool configurations are based.

The four quality classes described above may each be assigned different tolerance ranges, which are output either together with the quality information or which are known to the machine operator by instruction on the respective rock processing machine.

What is claimed is:

1. A rock processing machine comprising as machine components thereof:

a material feeding apparatus having a material buffer configured to load starting material to be processed;

at least one working apparatus comprising at least one crushing apparatus and/or at least one screening apparatus;

at least one conveyor configured to convey material between two machine components; and a display functionally linked to a data processor having a data memory connected thereto and associated with the rock processing machine, wherein the data processor is configured to:

ascertain, from data retrievable from the data memory which are based on at least one data collection basis, wear information regarding the wear of a working tool configuration of the at least one working apparatus;

ascertain for the ascertained wear information, starting from at least one data collection basis, on which at least a portion of the data used for ascertaining the wear information is based, quality information regarding a quality of the wear information; and output the wear information and the quality information via the display.

2. The rock processing machine of claim 1, wherein the data processor is configured to ascertain the quality information associated with the ascertained wear information from the at least one data collection basis, from which the data used for ascertaining the wear information derive, and to output this quality information via the display.

3. The rock processing machine of claim 1, wherein the quality information comprises an assignment of the wear information to an accuracy class from a plurality of different predetermined accuracy classes, wherein each accuracy class of the plurality of accuracy classes represents a tolerance range of different magnitude, within which a deviation of the actual wear from the output wear information is permissible.

4. The rock processing machine of claim 3, wherein the data used for ascertaining the wear information comprise an operational capacity value of the working tool configuration, wherein the operational capacity value is based on at least one of the following distinct data collection bases in an order of increasing accuracy: a general specification of the operational capacity value; and a usage-related specification of the operational capacity value.

5. The rock processing machine of claim 3, wherein:

the data used for ascertaining the wear information comprise a load value representing the usage load of the working tool configuration; and the load value is based on at least one of the following data collection bases in an order of increasing accuracy:

a period of use elapsed since the wear-free working tool configuration entered into use;

a usage quantity processed since the wear-free working tool configuration entered into use; and a usage load time or a usage load quantity as a period of use or usage quantity taking into account load effects that occurred during the use.

6. The rock processing machine of claim 5, comprising a wear ascertainment system configured to ascertain a state of wear of the working tool configuration, wherein the load value is based on the following data collection basis, along with the at least one other data collection bases, in the order of increasing accuracy:

an ascertained range of motion of the working tool configuration, the range of motion changing as a function of the state of wear of the working tool configuration.

7. The rock processing machine of claim 5, comprising a wear sensor system configured to sensorially ascertain a state of wear of the working tool configuration, wherein the load value is based on the following data collection basis, along with the at least one other data collection bases, in the order of increasing accuracy:

wear sensor data sensorially acquired at the working tool configuration.

8. The rock processing machine of claim 5, wherein:

the data used for ascertaining the wear information comprise an operational capacity value of the working tool configuration, wherein the operational capacity value is based on at least one of the following distinct data collection bases in an order of increasing accuracy: a general specification of the operational capacity value; and a usage-related specification of the operational capacity value; and the individual accuracy classes of the plurality of accuracy classes differ from one another in terms of the data collection bases of the operational capacity value and/or of the load value.

9. The rock processing machine of claim 1, wherein the ascertained wear information indicates a remaining operational capacity until a wear limit is reached.

10. The rock processing machine of claim 1, wherein the working apparatus is a crushing apparatus, the rock processing machine comprising a controller configured to:

change a crush gap width of a crush gap between two crushing tools as the working tool configuration of the crushing apparatus by displacing at least one crushing tool relative to the other crushing tool contributing to the formation of the crush gap; and ascertain wear information with respect to a state of wear of the working tool configuration by changing the crush gap to a crush gap width of zero.

11. The rock processing machine of claim 10, wherein:
the data used for ascertaining the wear information comprise a load value representing a usage load of the working tool configuration; and
the controller is configured to ascertain a state of wear of the working tool configuration, wherein the load value is based on the following data collection bases, in an order of increasing accuracy:
an ascertained range of motion of the working tool configuration, the range of motion changing as a function of the state of wear of the working tool configuration;
a period of use elapsed since the wear-free working tool configuration entered into use;
a usage quantity processed since the wear-free working tool configuration entered into use; and
a usage load time or a usage load quantity as a period of use or usage quantity taking into account load effects that occurred during the use.

12. The rock processing machine of claim 10, wherein the controller comprises the data processor.

13. The rock processing machine of claim 1, wherein, based on the quality information, the data processor ascertains and outputs time information for performing a future inspection of the working tool configuration.

14. The rock processing machine of claim 1, wherein:
the ascertained wear information indicates a remaining operational capacity until a wear limit is reached; and
the data processor is configured to compare a predicted state of wear for a future operating time with an ascertained state of wear of the working tool configuration within a predetermined time span after reaching the operating time, and based on a comparison of the predicted state of wear with the ascertained state of wear, to ascertain the quality information and/or ascertain and output time information for performance of a future inspection of the working tool system.

15. A method of conveying wear information for at least one working apparatus of a rock processing machine, the at least one working apparatus comprising at least one crushing apparatus and/or at least one screening apparatus, the rock processing machine associated with at least one data processor having a data memory connected thereto and linked to a display, the method comprising:
retrieving data from the data memory, based on at least one data collection basis;
ascertaining from the retrieved data wear information regarding the wear of a working tool configuration of the at least one working apparatus;
ascertaining for the ascertained wear information, starting from at least one data collection basis, on which at least a portion of the data used for ascertaining the wear information is based, quality information regarding a quality of the wear information; and
outputting the wear information and the quality information via the display.

16. The method of claim 15, comprising ascertaining the quality information associated with the ascertained wear information from the at least one data collection basis, from which the data used for ascertaining the wear information derive, and outputting the quality information via the display.

17. The method of claim 15, wherein the quality information comprises an assignment of the wear information to an accuracy class from a plurality of different predetermined accuracy classes, wherein each accuracy class of the plurality of accuracy classes represents a tolerance range of different magnitude, within which a deviation of the actual wear from the output wear information is permissible.

18. The method of claim 17, wherein:
the data used for ascertaining the wear information comprise a load value representing the usage load of the working tool configuration; and
the load value is based on at least one of the following data collection bases in an order of increasing accuracy:
a period of use elapsed since the wear-free working tool configuration entered into use;
a usage quantity processed since the wear-free working tool configuration entered into use; and
a usage load time or a usage load quantity as a period of use or usage quantity taking into account load effects that occurred during the use.

19. The method of claim 18, comprising ascertaining a state of wear of the working tool configuration, wherein the load value is based on one or more of the following data collection basis, along with the at least one other data collection bases, in the order of increasing accuracy:
an ascertained range of motion of the working tool configuration, the range of motion changing as a function of the state of wear of the working tool configuration; and
wear sensor data sensorially acquired at the working tool configuration.

20. The method of claim 18, wherein:
the data used for ascertaining the wear information comprise an operational capacity value of the working tool configuration, wherein the operational capacity value is based on at least one of the following distinct data collection bases in an order of increasing accuracy: a general specification of the operational capacity value; and a usage-related specification of the operational capacity value; and
the individual accuracy classes of the plurality of accuracy classes differ from one another in terms of the data collection bases of the operational capacity value and/or of the load value.

* * * * *